June 2, 1970   J. ARBERMAN ET AL   3,516,051
PROPORTIONAL WIDTH ECHO RANGE GATING SYSTEM
Filed Jan. 28, 1969   4 Sheets-Sheet 1

Jerome Arberman
Gunther Nietzel
INVENTORS

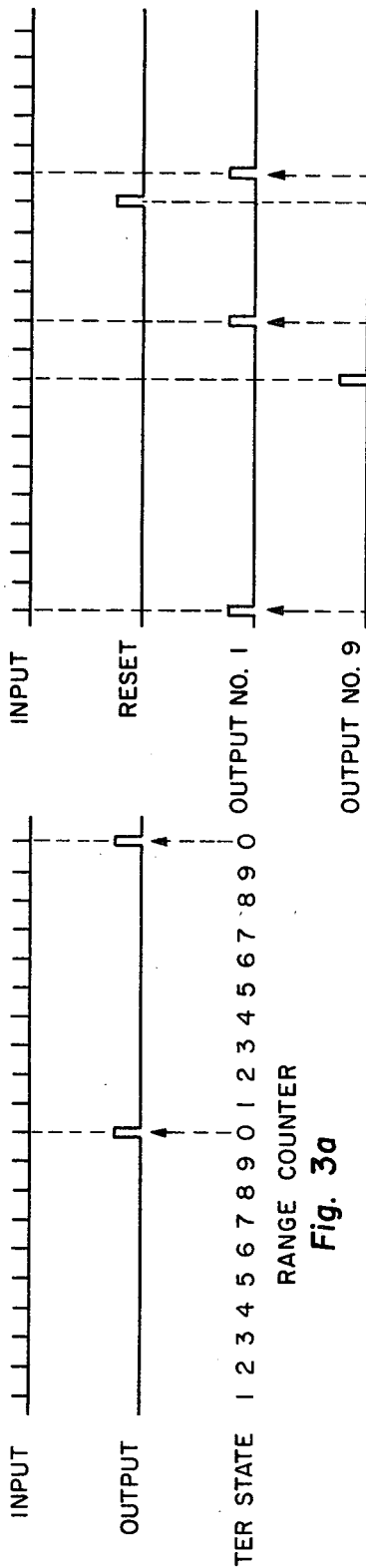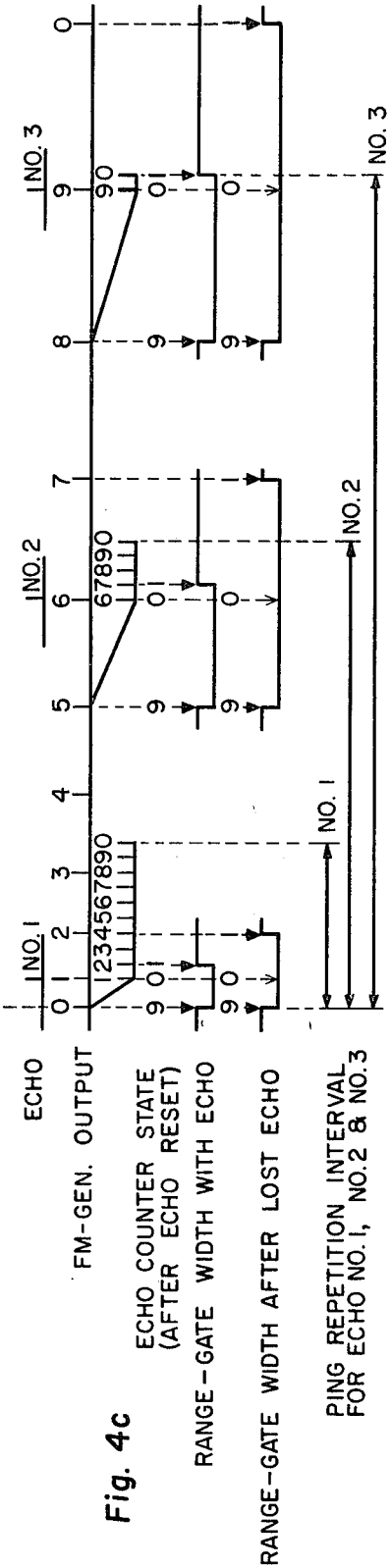

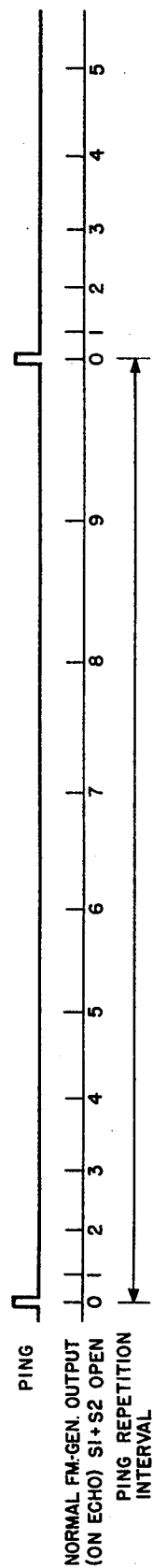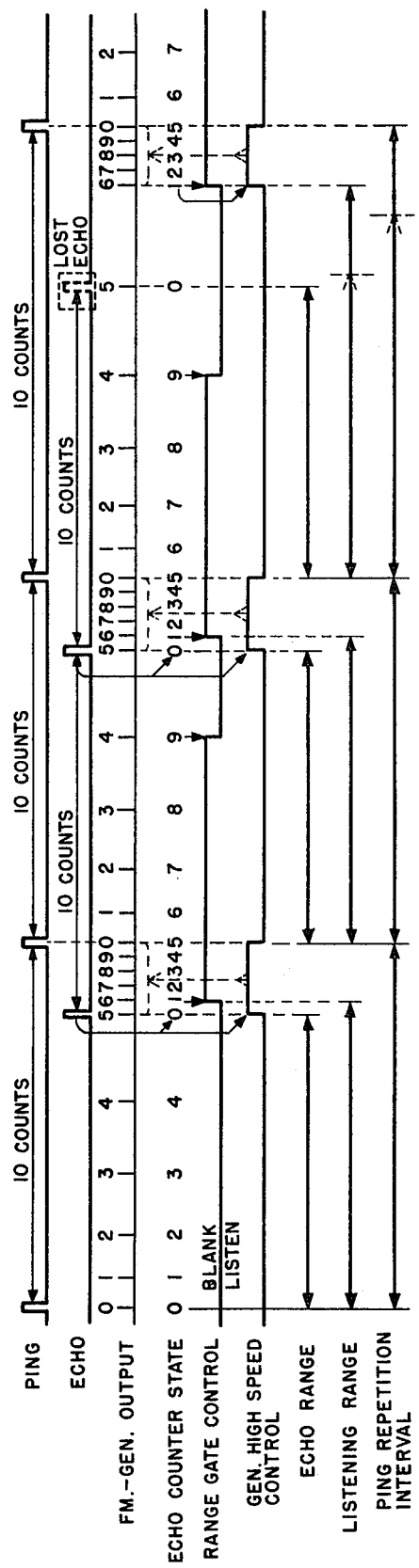
Fig. 4a
Fig. 4b

United States Patent Office 3,516,051
Patented June 2, 1970

3,516,051
PROPORTIONAL WIDTH ECHO RANGE GATING SYSTEM
Jerome Arberman, Cleveland Heights, and Gunther Nietzel, Wickliffe, Ohio, assignors, by mesne assignments, to the United States of America as represented by the Secretary of the Navy
Filed Jan. 28, 1969, Ser. No. 794,513
Int. Cl. G01s 9/68
U.S. Cl. 340—3                                    5 Claims

ABSTRACT OF THE DISCLOSURE

A proportional width echo range gating system which includes a range counter, an echo counter, an FM generator, a generator high-speed control and a range gate control for automatically controlling the listening time of an echo receiver in proportion to the distance of a potential target. By controlling the speed of the FM generator the ping repetition rate of the system can be varied to increase or decrease receiver listening time between echoes. An output from the echo counter maintains the ping repetition interval for a range at which the echo may be lost.

BACKGROUND OF THE INVENTION

This invention generally relates to underwater target ranging systems and more particularly to an echo range gating system with proportional width listening time.

Generally the location of a desired target is determined by measuring echo distance in terms of the reflection time delay after a transmitted impulse signal. Range gating systems are used to detect only those echoes emanating from a desired target range, such as those echoes in the vicinity of a submarine, and to suppress all echo responses from other targets outside of the desired range, such as those echoes emanating from the bottom of a body of water or from other reflecting surfaces. Such selective echo detection is commonly accomplished in range gating systems by blanking the echo receiver during predetermined parts of each cycle of operation commencing with the transmitted energy impulse or ping signal. This blanking of the echo receiver prevents echoes outside the desired target range from being received and hence from being detected and acted upon.

While somewhat satisfactory one of the problems with prior art range gating systems is their inability to provide the desirable condition of range consistency. More specifiically, it would be desirable in range gating systems to automatically adjust the receiver listening time in order to compensate for the difference in distance a potential target can travel during a long-range ping repetition interval as compared to a short-range ping repetition interval. Such a self-compensating range gate system would serve the useful purposes of reducing the echo receiver listening time to a minimum, providing reduced false alarm signals and allowing for an increased ping repetition rate to enable additional target information to be obtained.

SUMMARY OF THE INVENTION

Accordingly, one object of this invention is to provide a new and improved underwater target ranging system.

Another object of the instant invention is the provision of a new and improved echo range gating system which is capable of automatically adjusting the receiver listening time to provide range consistency.

A further object of the present invention is the provision of a new and improved echo range gating system which provides reduced false alarm signals.

A still further object of the subject invention is the provision of a new and improved range gating systems which allows for an increased ping repetition rate.

One other object of the instant invention is the provision of a new and improved echo range gating system wherein the ping repetition interval will be maintained for a range at which an echo may be lost.

Briefly, in accordance with this invention, these and other objects are attained by a system transmitting a ping signal in predetermined time intervals in response to a decreasing variable frequency source and then depending upon the expected receipt of an echo signal proportionally varying the receiver listening time to provide for range consistency.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 1b is a plot showing frequency versus real time for the four power sources used in conjunction with the explanational diagram of FIG. 1a;

FIGS. 3a, 3b and 3c are timing diagrams which respectively show the input, output and other terminal conditions of the range counter, echo counter and FM generator components of the present invention;

FIGS. 4a and 4b are timing diagrams respectively illustrating the operation of the range gating system of the subject invention in the event that no echo signal is present and in the event that an echo signal is present; and FIG. 4c is a timing diagram illustrating the range gate width and ping repetition rate with respect to echo range.

DETAILED DESCRIPTION OF THE PREFERRED EMBODIMENT

Figure 1A:
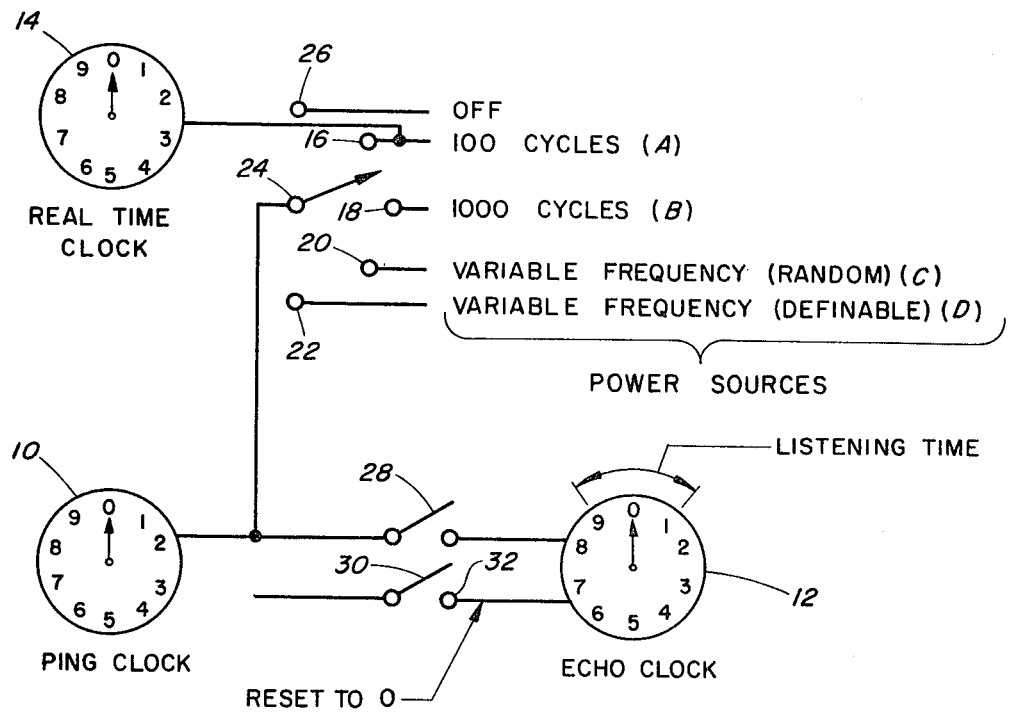
FIG. 1a is an explanational diagram which is useful in understanding the principle of operation of the echo range gating system of the present invention.
Figure 1B:
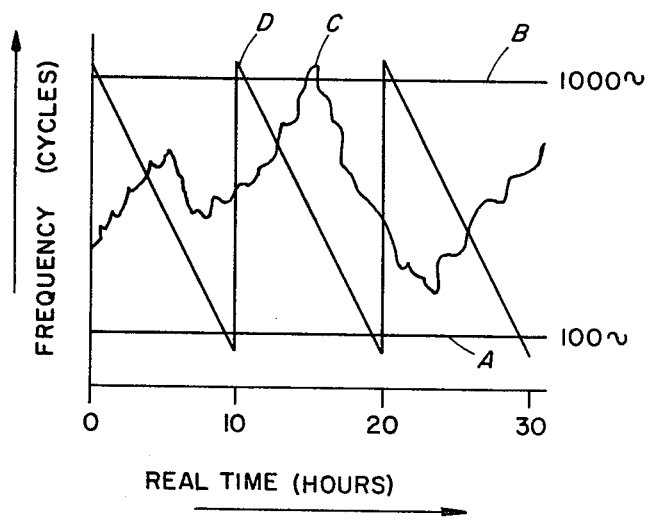

Referring now to the drawings wherein like reference characters designated identical or corresponding parts throughout the several views, and more particularly to FIG. 1a thereof wherein an explanational diagram useful in understanding the principle of operation of the proportional width range gating system according to the present invention is shown as consisting, in effect, of three clocks designated as a ping clock 10, an echo clock 12 and a real time clock 14. The pink clock 10 and echo clock 12 are capable of being fed by a plurality of four illustrative power sources A, B, C, and D connected to terminals 16, 18, 20, and 22 through a selector switch 24. A plot of the frequency versus real time of the four illustrative power sources is shown in FIG. 1b Referring now again to FIG. 1a, the 100 cycle source is shown as being connected to real time clock 14 so that the ping clock 10 and echo clock 12 will operate as ten hour clocks when connected to the 100 cycle source terminal 16. Should the ping clock 10 and echo clock 12 be connected to the 1000 cycle source at terminal 18 they will move ten times as fast and accordingly become one hour clocks. Likewise, when the ping clock 10 and echo clock 12 are connected to the random frequency source at terminal 20 no correlation to real time can be made. This can be readily explained by understanding that the clocks are basically counter systems having input representative of a series of events whose relation to real time is known. This is implied in FIG. 1a by the designation of input frequency since frequency is cycles per second or events per unit time. When the ping clock 10 and echo clock 12 are connected to the random frequency source at terminal 20 they essentially become counters, but not clocks, since although the hands will turn no correlation to real time can be made. Should the ping clock 10 and echo clock 12 be switched to the defined variable frequency at terminal 22 they will become clocks again since a relation will now exist between clock time and real time.

Assume now that both the ping clock 10 and the echo clock 12 are set to 00:00 clock time and the supply voltage is turned off by connecting the selective switch at terminal 24 to the off terminal 26. Immediately upon application of a supply voltage a ping signal will be generated since the ping clock 10 reads 00:00 and a ping signal is generated each time the ping clock 10 reaches 00:00. If the 100 cycle source supply voltage at terminal 16 were chosen then a ping signal will occur every ten hours. If the 1000 cycle source supply voltage at terminal 18 were chosen then the ping signal interval would be reduced to one hour. Understanding that the echo clock 12 will not be energized unless an echo signal is detected, the echo clock 12 continues to read 00:00. When the echo clock 12 reads 00:00, the echo detection receiver is unblanked and in the listening mode.

Now let it be assumed that a 100 cycle input, that is a ten hour ping interval, is applied at terminal 16 through terminal 24 to the ping clock 10 and that an echo signal arrives at 03:00 ping clock time. At the time of arrival of the echo signal, which 30 will close momentarily and switch 28 will cause the 100 cycle power source to be applied to echo clock 12. It should be apparent that the echo clock time now lags the ping clock time by three hours. This indicated time leg represents a phase offset between the ping clock 10 and the echo clock 12 and since the clocks count events and are fed from the same source they can be stopped, started or switched to any source input and the difference in clock time indication does not change. There will always be a three hour indicated difference between the clocks. Assume now that no change has been made to the input circuit at time 03:00 when the echo signal arrived. Seven hours later, the ping clock will generate another ping signal since it again will read 00:00. The echo clock will read 07:00 because it is still lagging the ping clock by three hours. Three hours later at 03:00 on the ping clock 10 another echo signal is expected. This is because the first echo signal occurred at 03:00. By this time the echo clock 12 will have advanced three hours to read 00:00. From the above it can be seen that the range gating system will expect an echo signal every time the echo clock approaches 00:00 hours. In essence then a range memory system has been synthesized. The reason for this is that the ping interval and the echo interval are approximately equal for the echo ranging system. In fact, the respective intervals will differ only by the target closure distance during a ping interval.

Since as explained hereinbefore echoes are expected at 00:00 hours, a listening time between 09:00 and 01:00 echo clock time can be selected to provide a gate width of two hours for the expected echo. During the echo clock time between 01:00 and 09:00 the echo receiver will be blanked so that any echoes appearing during such time interval will not be detected.

The condition of target closure now will be examined. Assume the previously discussed example of an echo appearing at 03:00 ping clock time. This started the echo clock 12 from 00:00 and another echo is expected again at 00:00. Since some target closure rate is expected, the echo receiver listening period may be started at 09:00 echo clock time. This will correspond to 02:00 ping clock time realizing that the echo clock 12 is still three hours behind the ping clock 16. Suppose now that the echo signal arrives a half hour early due to closure. It will then arrive at 02:30 ping clock time. However, since the echo clock time is now 09:30 the echo receiver is in the listening mode so that the echo, even though one-half hour earlier then expected, can be received. The echo reception will momentarily close an echo clock reset circuit at terminal 32 whereupon echo clock hand will then instantaneously move from its 09:30 position to the 00:00 position with the result that the echo clock 12 will now lag the ping clock 10 by only two and one-half hours. Thus, on the next ping interval the echo clock 12 will pass 00:00 when the ping clock 10 reads 02:30. Thus, the listening period has moved one-half hour closer to the ping time and is now prepared to receive an echo between 01:30 and 03:30 ping clock time.

So far we have seen the generation of a range gate system which allows for compensation due to closure rate of change. Now it will be shown how the ping interval can be made to decrease as the range decreases. Returning to the initial assumption of an echo signal at 03:00 ping clock time, it should again be noted that a seven-hour delay will elapse before the next ping signal. This is so because the ping signal time is at 00:00 which is seven hours after the echo signal reception. Since it is undesirable to wait that long, the received echo is used to switch the power source from the 100 cycle line at terminal 16 to the 1000 cycle line at terminal 18. Both the ping clock 10 and the echo clock 12 now become one hour clocks in real time. Thus, the next ping signal will occur at 00:00 ping clock time, but it will occur only seven-tenths hours later rather than seven hours later. It is to be understood that during this high speed run-off the indicated clock time difference between the ping clock 10 and the echo clock 12 does not change since the clocks being synchronized will remain the three hour indicated time difference that was present when the echo signal arrived. Now when the ping clock 10 again reads 00:00 another ping signal will be generated and the supply voltage will be switched from the 1000 cycle line at terminal 18 back to the 100 cycle line at terminal 16 so that the clocks are put back in step with real time. This is necessary since the echo range must be measured in real time to give a meaningful indication. Thus, dead time (time between an echo signal and the next ping signal) is effectively minimized by running the ping clock 10 and the echo clock 12 off at a high rate and then returning them to a real time rate for the next ranging period. As previously explained, this is accomplished without loss of indicated time difference.

In the event that an echo signal is received and then lost, it is desirable to maintain approximately the last ping interval since it is both impractical and time consumng to listen to a maximum range time if previous echoes occurred at a short range. Maintaining approximately the last ping interval can be accomplished in the following manner. Normally when an echo signal is received, the supply power, as explained above, is automatically switched to the 1000 cycle line source at terminal 18 to reduce the dead time. If no echo signal is received and a ten hour ping time is desired then no switching will take place. However, when it is desirable to maintain approximately the last ping interval, the end of the listening time (for example, 01:00 echo clock time) can be used to switch the suply source to the 1000 cycle line at terminal 18. This switching will reduce the dead time for expected yet missed echoes. Thus although the ping interval will be increased by some amount, that amount is only a small percentage of the ping interval. In fact this increase of the ping interval will be equivalent to the time between the expected echo and the end of the listening period. This slight time increase is desirable as it serves to increase the effective gate width to allow for opening or lost echo conditions.

The heretofore described system provides almost all of the functions desired of a range gating system except that the listening time is fixed for all ranges. That is the range gate width or listening time is a constant in real time. This difficulty can be overcome as follows. Understanding that at long ranges the ping interval is long and the distance traveled by a target per ping interval is larger than at short ranges, it is desirable to provide a range gate whose width is proportional to range. This means that the clock listening time between 09:00 and 01:00 echo clock time should not be constant as compared to real time. What is desired is that the two hours listening time be shorter in real time when the ping clock 10 reads 01:00 than when the ping clock 10 reads 09:00 because the ping clock indication is a measure of the range at the instant the echo clock 12 passes 00:00. The solution to this problem is to use a definable variable frequency power source such as the one labeled C in the plot of FIG. 1b and provided at terminal 22 in FIG. 1a. The use of such power source will result in the desired non-linear clock operation. The ping clock 10 and the echo clock 12 will no longer read correctly in real time, but since their readings are definable they may be converted to real time. For example, since a reading of ping clock 10 represents range, if fed from any linear (fixed frequency) source, 05:00 will represent half range. Should the ping clock 10 be fed from the definable variable frequency source at terminal 22, 05:00 would not necessarily represent half range. In fact half range may occur at 08:00 ping clock time, but if this is so, half range will always occur at 08:00. This makes it possible to use non-linear clocks but to still select an accurate range function which must be measured in real time. The effect of the definable variable frequency source is that the hand of ping clock 10 will leave 00:00 at a high rate of speed. The rate of speed will decrease gradually and is a minimum as the reading approaches 00:00. Since the speed of echo clock 12 is the same as the speed of ping clock 10 at any given time (they are fed from the same source), the listening time will be proportional to the indicated ping clock time when the echo clock 12 passes 00:00. This is because the speed of ping clock 10 is now proportional to its reading which in turn represents range.

Figure 2:
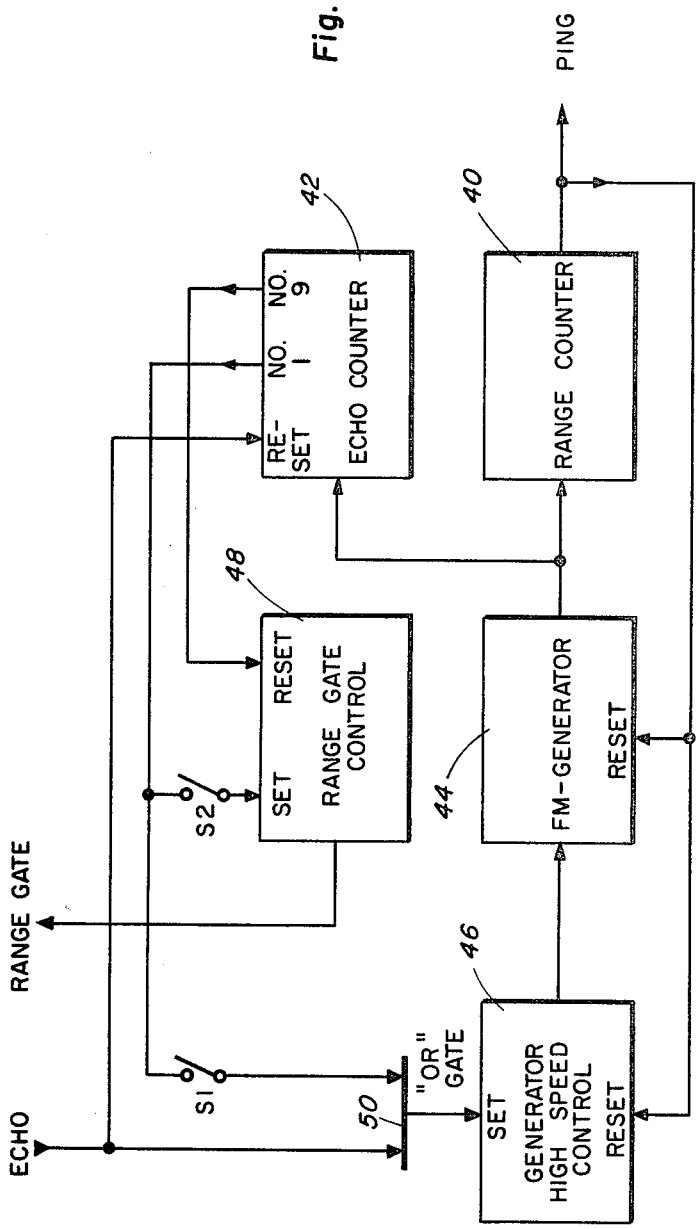
FIG. 2 is a block diagrammatic view of the overall proportional width echo range gating system according to the present invention.
Figure 3C:
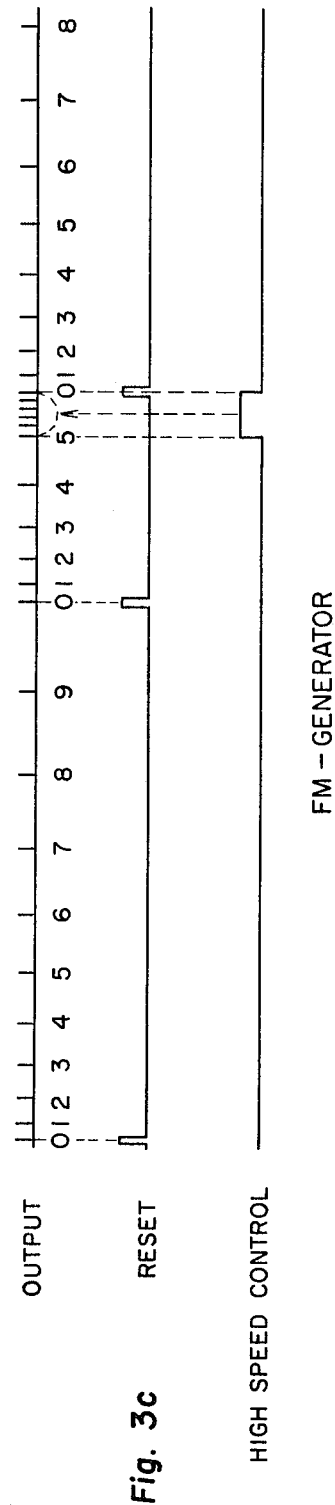

Referring now to FIG. 2 the proportional width echo range gating system shown thereon will be explained in connection with a ten count cycle. The system includes a range counter 40, which may be a conventional digital decade counter, for providing an output ping pulse signal for every ten input pulses applied thereto. The relationship between the input and output signals of range counter 40 is shown in the timing diagram of FIG. 3a. Also in-is an echo counter 42, which also may be a conventional digital decade counter similar to range counter 40 except that it can be externally reset to the zero state and it has two outputs, namely, one appearing at the number one count and another appearing at the number nine count. If echo counter 42 is not externally reset, it will recycle itself to the zero state at the number ten count. The relationship between the input, output and other terminal signals of the echo counter 42 is shown in the timing diagram of FIG. 3b. An FM generator 44, which may be for example a conventional pulse generator, provides a variable definable decreasing frequency signal to both the range counter 40 and the echo counter 42. When a reset pulse due to a ping signal output from range counter 40 is received by the FM generator 44 the frequency output thereof will constantly decrease until another reset pulse is applied from the range counter 40 ten pulses later. The first pulse interval at the time of reset, as well as the following decreasing rates, are predetermined and controlled by the characteristics of the FM generator 44. If a high speed input signal from the set condition of a generator high speed control 46, such for example as a conventional set-reset type flip-flop, is applied to the FM generator 44 the output pulses therefrom will be of a fixed frequency much higher than that of the basic reset frequency. The relationship between the input and output signals of the FM generator 44 is shown in the timing diagram of FIG. 3c.

It should be understood that the main reason for using an FM generator rather than a constant rate generator is to provide a variable gate width with respect to range. A range gate control 48, which may also be a conventional set-reset type flip-flop, controls the opening and closing of the range gate for providing the desired echo receiver listening time. The echo receiving circuitry (not shown in the drawing) is disabled when the range gate control 48 is in the set condition. Switches S1 and S2 are used to simulate circuitry for controlling the use of range gating and range holdover. Both switches are designed to close upon the arrival of the first echo signal will remain closed thereafter.

To minimize cross reference between the range gating system block diagram of FIG. 2 and the operational timing diagrams of FIGS. 4a and 4b, the following conditions of FIG. 2 are to be noted. A ping signal will occur every time the range counter 40 passes its zero state, that is, every ten output pulses from the FM generator 44. A ping signal will always reset both the FM generator 44 and the generator high-speed control 46. A received echo signal will always set the generator high-speed control 46 and reset the echo counter 42 to the zero state. The nine count output of the echo counter 42 will reset the range gate control 48 and enable echo listening. The one count output of the echo counter 42 will set both the range gate control 48 and the generator high speed control 46 after switches $S_1$ and $S_2$ are closed by an echo. A conventional digital "OR" gate 50 allows either the received echo or the number one output of echo counter 42 (in the event an echo is lost) to set the generator high speed control 46.

Referring now to FIG. 2 in conjunction with FIG. 4a the operation of the proportional width range gating system in the event that no echo signal is present can be explained as follows. The first ping signal generated by the range counter 40 will reset the FM generator 44. Since no echo signal is present, the generator high speed control 46 is not set and switches S1 and S2 are open. This prevents the range gate control 48 from being set which in turn allows the echo receiver (not shown) to operate in a listening mode. Whenever the echo counter 42 reaches a nine count, the output pulse taken therefrom resets the already reset range gate control 48. Accordingly, the FM generator will operate at its normal decreasing rate for ten pulses thus allowing for a maximum possible echo listening range.

Referring now to FIG. 4b in conjunction with FIG. 2 the operation of the proportional width range gating system of the present invention will be explained under the condition where an echo signal is present. For example, let it be assumed that five counts after a ping signal is generated by range counter 40 an echo signal is received. The echo signal will automatically reset the echo counter 42 to the zero state, close switches S1 and S2 and set the generator high speed control 46 through operation of "OR" gate 50. The setting of the generator high-speed control 46 will in turn cause the FM generator 44 to increase pulse rate until the next pin signal is transmitted. In addition, one count after the first echo is received the range gate control 48 will be set by the number one count output of the echo counter 42 and thus disable the echo receiving circuitry (not shown). A second pin signal will be transmitted by the range counter 40 ten counts after the first ping signal appeared. Since there are always ten counts from one pin to the next and since the echo signal has received five counts after the first ping, the second echo signal will be expected five counts after the second ping signal or ten counts after the first echo signal. In short, the echo repetition interval is approximately equal to the ping repetition interval. In order to receive the second echo the range gate must be opened prior to the expected echo range. This is accomplished by the number nine count output of echo counter 42 which occurs nine counts after the first echo (or one count before the expected echo) and will reset the range gate control and allow echo receiving. The second echo signal will again reset the echo counter 42 and repeat the same sequence of events as occurred after the first echo. In the third pin sequence shown in FIG. 4b the echo signal was lost. Under such a condition, the echo counter 42 will recycle itself at the tenth FM generator 44 output pulse after the second echo signal. This is the very time that the third echo signal is expected. Since the third echo signal did not arrive, the generator high-speed control 46 is not set until one count after the expected echo range at which time it is set by the number one count output of the echo counter 42 which is passed through "OR" gate 50. It should be noted that the one count delay in the generator high-speed control 46 will increase the echo listening range by one count at the normal FM generator 44 speed. Thus, after the echo signal is lost, the number one count output from echo counter 42 will continue to set the generator high-speed control 46 and maintain the last ping repetition interval until switches S1 and S2 are opened. This in turn causes the system to return to a maximum ping repetition interval and a no range gating condition. If in FIG. 4b the listening range is compared with the FM generator output, it will be noted that the duration of the listening range is equal during the first two intervals when an echo signal appeared but is longer during the last interval when the echo signal was lost. However, it is seen that the listening range still occurs in all three intervals from the number zero to the number six count of the FM generator output. The difference in listening time can be explained as follows. During the first two intervals the generator high-speed control 46 was set by an echo at count number five while during the third interval the generator high-speed control was set by the number one count output of the echo counter 42. The ping repetition interval is changed accordingly and thus lengthens the range gate width or echo receiver listening time.

Referring now to FIG. 4c the range gate width and ping repetition rate are illustrated with respect to echo range. In the figure, each echo signal is handled separately as a single echo which reoccurs at the same range within one listening range. For example, echo number two is shown as occurring at the sixth count after a ping signal. The range gate was opened one count before the echo which caused the FM generator 46 to speed up and the number one count output from the echo counter 42 closed the range gate one count after the expected echo. It is also seen in FIG. 4c that the range gate width is increased after a lost echo, since the FM generator speed-up was not caused by an echo signal but one count later by the number one count output of the echo counter 42.

It should be apparent that the echo range gating system of the herein described invention provides range consistency and minimum receiver listening time. It should also be apparent that while the invention has been described for clarity using decade counters with particular range and ping interval outputs that the invention is not so limited and that other counter and interval outpus could be equally used.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. A proportional width echo range gating system for varying receiver listening time comprising:
   means for transmitting a ping signal at predetermined differing intervals, said means including a recycling first counter means for generating said ping signal each time a predetermined count is reached; and,
   means responsive to the presence of said ping signal or the absence thereof for proportionately varying the receiver listening time whereby range consistency is provided.

2. A proportional width echo range gating system as in claim 1 wherein said means responsive includes:
   a second counter means for providing a plurality of outputs therefrom at differing predetermined counts, said second counter being capable of automatically resetting upon receipt of an echo signal,
   a variable definable decreasing frequency generating means for supplying pulses to both said first and said second counter means,
   a first bistable means responsive to both said ping and said echo signals for controlling the speed of said generating means, and
   a second bistable means responsive to one of said plurality of outputs of said second counter means for allowing a range consistent receiver listening time.

3. A proportional width echo range gating system as in claim 2 wherein said first counting means and said second counting means are digital counters.

4. A proportional width echo range gating system as in claim 2 wherein said first bistable means and said second bistable means are set-reset flip-flops.

5. A proportional width echo range gating system as in claim 2 further including a digital "OR" gate for setting said first bistable means upon receipt of either an echo or another one of said plurality of outputs of said second counter means whereby said ping interval will be approximately maintained in the event that said echo becomes lost.

References Cited
UNITED STATES PATENTS

| | | | |
|---|---|---|---|
| 3,075,789 | 1/1963 | Lisicky | 343—7.3 |
| 3,189,896 | 6/1965 | Schmidt et al. | 343—7.3 |
| 3,344,421 | 9/1967 | Dildy | 343—7.3 |
| 3,360,795 | 12/1967 | Lundgreen et al. | 343—7.3 |

RICHARD A. FARLEY, Primary Examiner

U.S. Cl. X.R.

343—7.3, 7.5